United States Patent
Groves

[15] 3,698,756
[45] Oct. 17, 1972

[54] GRIPPER DEVICE HAVING POSITIVE ENGAGING AND DISENGAGING MEANS

[72] Inventor: Malcolm D. Groves, Simsbury, Conn.

[73] Assignee: Combustion Engineering, Inc., Windsor, Conn.

[22] Filed: Dec. 8, 1969

[21] Appl. No.: 882,832

[52] U.S. Cl. .................294/96, 294/86.25, 166/216
[51] Int. Cl. ...........................B66c 1/54, B66c 1/42
[58] Field of Search.......294/86, 86.25, 86.27, 86.31, 294/86.33, 93, 94, 96; 166/217, 216

[56] References Cited

UNITED STATES PATENTS

| | | | |
|---|---|---|---|
| 1,480,378 | 1/1924 | De Armond | 294/96 X |
| 3,408,101 | 10/1968 | Savary | 294/86.25 |
| 3,467,186 | 9/1969 | Current | 166/216 |

*Primary Examiner*—Harvey C. Hornsby
*Assistant Examiner*—Merle F. Maffei
*Attorney*—Eldon H. Luther, Robert L. Olson, John F. Carney and Richard H. Berneike

[57] ABSTRACT

A gripper device for selectively remotely coupling and uncoupling a linearly moving driving member to a member to be driven. The gripper device fixed to the driving member has a plurality of radially flexible fingers with each finger having a gripping surface at its outer end for gripping the member to be driven. Radial movement of the fingers into and out of gripping engagement is controlled by a central locking plunger rod and an outer unlocking sliding sleeve concentric with the flexible fingers. The locking plunger rod and the unlocking sliding sleeve are interconnected for limited relative movement and have cam surfaces oriented thereon, these cam surfaces selectively engaging cam surfaces on the flexible fingers to positively move the fingers into or out of gripping engagement with the driven member upon particular longitudinal movements of the locking plunger rod and unlocking sliding sleeve.

9 Claims, 5 Drawing Figures

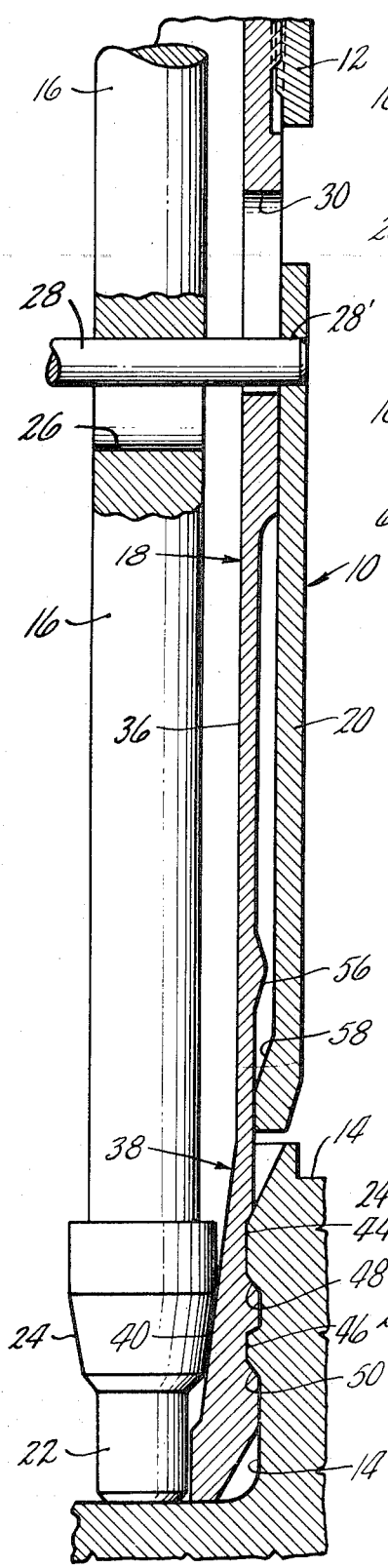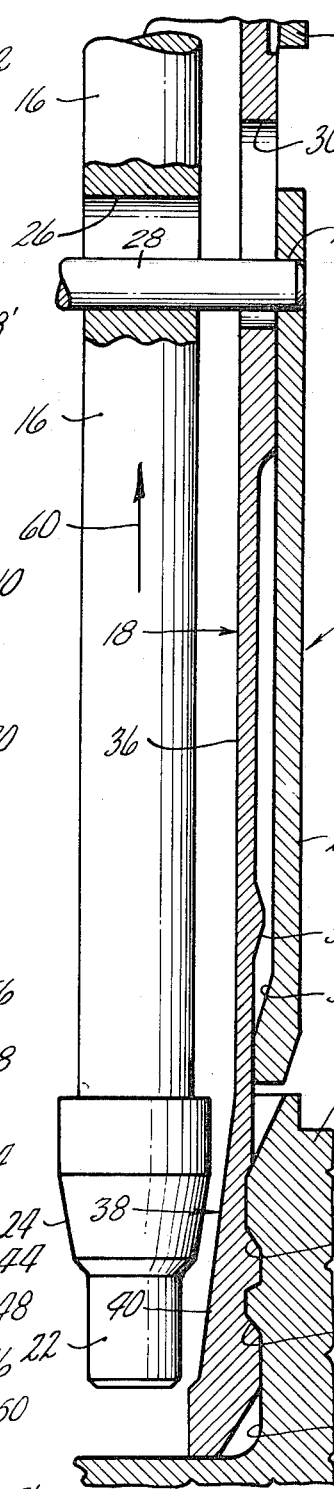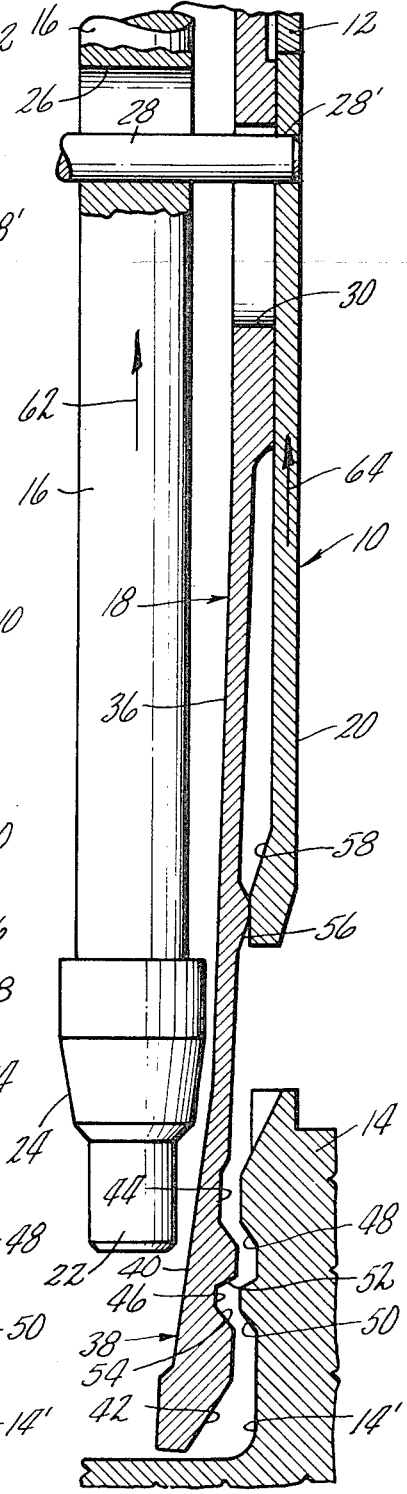
INVENTOR
MALCOLM D. GROVES
BY Lawrence P. Kessler
ATTORNEY INVENTOR
MALCOLM D. GROVES
BY Lawrence P. Kessler
ATTORNEY

GRIPPER DEVICE HAVING POSITIVE ENGAGING AND DISENGAGING MEANS

BACKGROUND OF THE INVENTION

In many mechanical applications it is desired to obtain an automatic remote coupling action between two elements through relative linear movement along the longitudinal axis of the elements. For example, in remotely connecting a linearly moving driving member to a member to be driven, relative movement between the driving and driven member desireably serves to selectively couple and uncouple the members through a remotely actuated coupling device. One exemplary application of this desired principle is the remote connection of the control element assembly within a pressurized water nuclear reactor to the drive mechanism therefor.

A pressurized water nuclear reactor includes a core structure in which a plurality of elongated fuel elements of a fissionable material are supported. Power is generated by a controlled chain reaction, initiated in a known manner by atomic reaction with thermal neutrons produced by the fissionable material, the control thereof being accomplished at least in part by adjustment of the position of control rods of a neutron absorption material within the reactor core. The adjustment of the rods is regulated by individual drive shafts powered by known drive mechanisms.

The drive shafts and control rods are interconnected through automatic remote coupling devices. The coupling devices in common use comprise a remotely actuated elongated member relatively linearly movable with respect to a gripping member so as to lock the gripping member and the drive shaft to which it is attached into engagement with the control rod or permit the gripping member to be free from gripping engagement therewith. The drive shaft will then drive the control rod if the elongated member locks the gripping members, or if the elongated member frees the gripping member from gripping engagement, uncoupling will be accomplished by the reaction of the control rod weight against the gripping member upon movement of the drive shaft out of the reactor core.

Remote coupling devices in general, and more particularly devices of the above described type, suffer from the disadvantage of not being fully reliable under desired disconnect conditions due to the fact that there is no positive means to insure gripping member disengagement from the driven member. Any seizure between the gripping member and the member to be driven would prevent the weight of the driven member from effecting the coupling disengagement necessary to permit rapid and positive release therebetween.

SUMMARY OF THE INVENTION

This invention provides an automatic coupling device remotely actuated by relative linear movement of the coupling elements along the longitudinal axis thereof, the coupling device having a positive means for effecting uncoupling to insure disengagement of the coupling elements. Radially flexible gripping members of the driving member coupling element are urged into and out of gripping engagement with the driven member coupling element by cam surfaces on a remotely actuated locking member and an unlocking sleeve concentrically located with respect to the flexible fingers. The central locking member and the concentric unlocking sleeve are interconnected such that there is limited relative movement therebetween so as to establish optimum positioning of the cam surfaces for effecting a positive uncoupling action in the shortest practical limited movement of the coupling elements. Application of this novel arrangement, for example, in the coupling of the control rod of a nuclear reactor to its associated drive as discussed above is ideal in that a positive and certain release is assured.

BRIEF DESCRIPTION OF THE DRAWINGS

FIG. 1 is a longitudinal view partly in section of the gripper device according to the principles of this invention, the gripper device being in its gripping position.

FIG. 2 is a longitudinal view similar to FIG. 1 with the gripper device in an intermediate position.

FIG. 3 is a longitudinal view similar to FIG. 1 with the gripper device in its positive unlocking position.

DESCRIPTION OF THE PREFERRED EMBODIMENT

Figure 4:
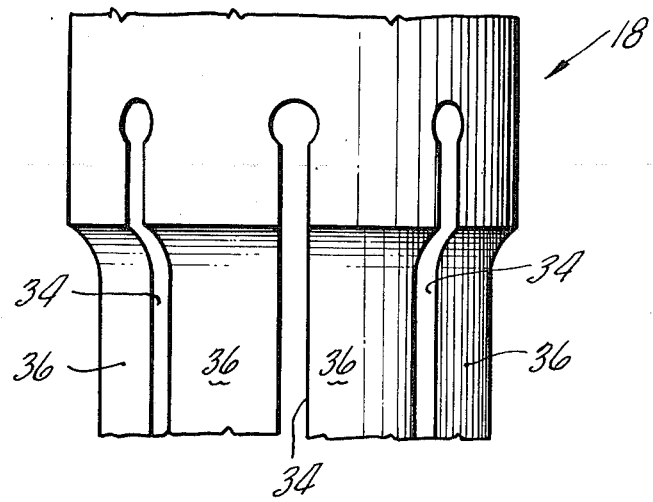
FIG. 4 is a view of a segment of the gripping means according to the principles of this invention.

In FIGS. 1 to 3 there is shown a gripper device organization, generally designated 10, interconnecting a driving member 12 and a driven member 14, the members desireably being capable of remote coupling so that member 12 may selectively linearly drive member 14. It is understood that as an illustrative example, driving member 12 may be the extension shaft of a control element assembly driving mechanism for a nuclear reactor and the driven member 14 may be a control element for controlling the chain reaction therein.

The gripper device 10 is comprised of three main elements: a central plunger rod 16, an elongated gripping means 18 and an outer sliding sleeve 20. The central plunger rod 16, located for limited selective movement along the central axis of the gripping means 18, has at its lower end 22 a cam surface 24 for effecting positive locking of the gripping means 18 in the manner to be described hereinbelow. The plunger rod 16 additionally has a slot 26 through which a pin 28 extends, the pin being fixed in a bore 28' in the outer sliding sleeve 20. The pin 28 passes through a slot 30 in the gripping means 18 so that the three members are interconnected for relative longitudinal movement.

Figure 5:
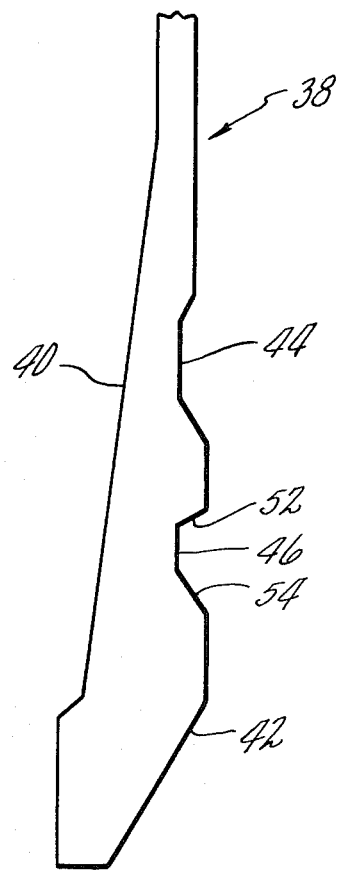
FIG. 5 is a detailed view of the engaging surfaces of the gripping means according to the principles of this invention.

The gripping means 18 (FIG. 4) is formed of a hollow cylinder 32 fixed at its upper end to driving member 12, and having longitudinal slots 34 along a substantial portion of the length thereof to form radially flexible fingers 36. The flexible fingers 36 have a degree of resiliency permitting them to move radially inwardly and outwardly upon uncoupling and coupling action, respectively. The details of the engaging surfaces of the lower end 38 of the flexible fingers 36 of the gripping means 18 are best seen in FIG. 5. The inside surface of the lower end 38 of the flexible fingers 36 has a gradual sloping cam surface 40. The outside surface of the lower end 38 of the flexible fingers 36 has a sharply angled guide surface 42 and a plurality of notches 44, 46 for receiving gripping teeth 48, 50 located on the face of a bore 14' within the member 14 to be driven. The surfaces 52 and 54 of the tooth-receiving notch 46 are sloped at different angles to that upon linear driving action of member 14 by member 12 in a coupled condition wear-causing vibrations or chattering does not occur between the gripping device 10 and the driven member 14. While it is important that the angles of the surfaces 52, 54 be different the selected angles of these surfaces (and of the surfaces of tooth-receiving notch 44) are no longer critical in that there is no dependence upon the action of the weight of the driven member 14 on the surfaces to effect uncoupling as in prior remote coupling devices.

Each of the redially flexible fingers 36 has a cam surface 56 along the outer portion of the finger at some distance above the lower end 38. The cam surface 56 will engage a cam surface 58 at the lower portion of the outer sliding sleeve 20 in order to effect positive uncoupling of the gripping means 18 by initiating radially inward flexing of fingers 36 in a manner to be described hereinbelow. The location of cam 56 is selected to enable the flexible fingers to be fixed radially inwardly out of gripping engagement without interferring with the selective reciprictaory movement of central plunger rod 16. The relative movement between the central plunger rod 16 and the outer sliding sleeve 20 caused by the pin-in-slot arrangement therebetween permits the location of cam surface 56 on the flexible fingers 36 to be selected in such a manner so as to give an increased mechanical advantage for the positive unlocking action forced on the flexible fingers 36 by the cam surface 58 of the outer sliding sleeve 20. Furthermore, the relative movement permits the positive coupling and uncoupling to be accomplished in the shortest practical linear movement of the coupling elements.

The operation of the gripper device 10 is as follows. When in the coupled position shown in FIG. 1, the central plunger rod 16 is selectively remotely moved upwardly relative to the driving member 12 by any suitable means (not shown) in the direction of the arrow 60 until the lower surface of the slot 26 engages the pin 28 as shown in FIG. 2. This releases the flexible fingers 36 of the gripping means 18 to permit them to be positively disengaged upon further movement of the plunger rod 16. Positive disengagement is accomplished by continuing the upward movement of the plunger rod 16 in the direction of the arrow 62 so that the pin 28 and the outer sliding sleeve 20 are carried upwardly in slot 30 relative to the gripping means 18. This will result in cam surfaces 58 of the sliding sleeve 20 engaging cam surface 56 on the flexible fingers 36 of the gripping means 18 to flex the fingers radially inwardly to positively disengage the tooth-receiving notches 44, 46 of the gripping surface of the gripping means 18. Upward linear movement of member 12 will then effect complete disengagement of the device.

When reinsertion of the gripper device 10 within the internal bore 14' of the driven member 14 is desired, downward linear movement of member 12 will position the gripper device 10 within the bore 14'. The flexible fingers 36 are retained in their inwardly flexed positive unlocked position shown in FIG. 3 so that the guide surfaces 42 on the lower end 38 of the flexible fingers 36 will guide the gripper device 10 into the bore 14' thus permitting a greater degree of misalignment to be accepted between the driving member 12 and the driven member 14. The plunger 16 is then remotely moved downwardly relative to the gripping means 18 until the top of slot 26 engages pin 28. Further downward movement will move sliding sleeve 20 downwardly thus causing cam surface 58 to release flexible fingers 36 and permit cam surface 24 of plunger 16 to flex the fingers 36 into locking engagement.

From the foregoing it can be seen that there has been developed a novel gripper device having positive engaging and disengaging means to assure coupling and uncoupling of a longitudinal acting driving member to a member to be driven. By providing remotely actuated coupling elements as concentric locking and unlocking means with radially flexible finger gripping elements therebetween and establishing a particular relative movement between the elements, it is possible to provide a positive remote coupling and uncoupling action in the shortest practical linear movement of the elements. Additionally, the fact that a positive unlocking action is provided eliminates the necessity for critical gripping surface angles required when uncoupling is dependent upon the weight of the driven member.

While this preferred embodiment of the invention has been shown and described, it will be understood that it is merely illustrative and that changes may be made without departing from the scope of the invention as claimed.

I claim:

1. A gripper device for selectively remotely coupling a linearly moving driving member to a member to be driven, the gripper device comprising: elongated gripping means connected to said driving member and selectively engagable with said member to be driven; a positive locking means relatively longitudinally movable with respect to said gripping means into a first position, a second position, and a third position, said positive locking means forcing said gripping means into gripping engagement in said first position and releasing the locking force in said second and third positions; and a positive unlocking means relatively longitudinally movable with respect to said gripping means and said locking means into a first position and a second position; said positive unlocking means forcing said gripping means out of gripping engagement in said first position and releasing the unlocking force in said second position; said unlocking means being in said first position when said locking means is in said third position and said unlocking means being in said second position when said locking means is in either it first or second position.

2. The apparatus of claim 1 wherein said positive locking means and said positive unlocking means have a connection means therebetween whereby longitudinal movement of said positive locking means between its first and second positions causes no movement of said positive unlocking means and longitudinal movement of said positive locking means between its second and third positions causes movement of said positive unlocking means between its first and second positions.

3. The apparatus of claim 2 wherein said connection means includes a pin-in-slot arrangement.

4. The apparatus of claim 1 wherein said elongated gripping means includes a cylindrical tube having a plurality of longitudinal slots extending along a substantial portion of the length thereof forming radially flexible fingers therebetween, said flexible fingers having locking and unlocking cam surfaces along the length thereof, said cam surfaces located for respective engagement with said positive locking means and said positive unlocking means upon relative movements thereof.

5. The apparatus of claim 4 wherein each of said fingers has a gripping surface located at the outer portion of one end thereof.

6. The apparatus of claim 5 wherein said gripping surfaces include a plurality of tooth receiving notches mating with complementary teeth on said member to be driven, the angles of the slope of opposite surfaces between said gripping surface notches being unequal.

7. The apparatus of claim 4 wherein said positive locking means includes a plunger rod extending through said cylindrical tube along the central axis thereof, said plunger rod having a cam surface at the lower end thereof for positive engagement with the locking cam surfaces of said flexible fingers upon relative longitudinal movement therebetween.

8. The apparatus of claim 7 wherein said positive unlocking means includes a sliding sleeve positioned concentrically of said cylindrical tube, said sliding sleeve having a cam surface at the lower end thereof for positive, engagement with the unlocking cam surfaces of said flexible fingers upon relative longitudinal movement therebetween 9. The apparatus of claim 8 wherein said plunger rod said sliding sleeve are interconnected by a pin-in-slot arrangement so as to coordinate the positive locking and unlocking actions thereof.

* * * * *